Patented Nov. 12, 1929

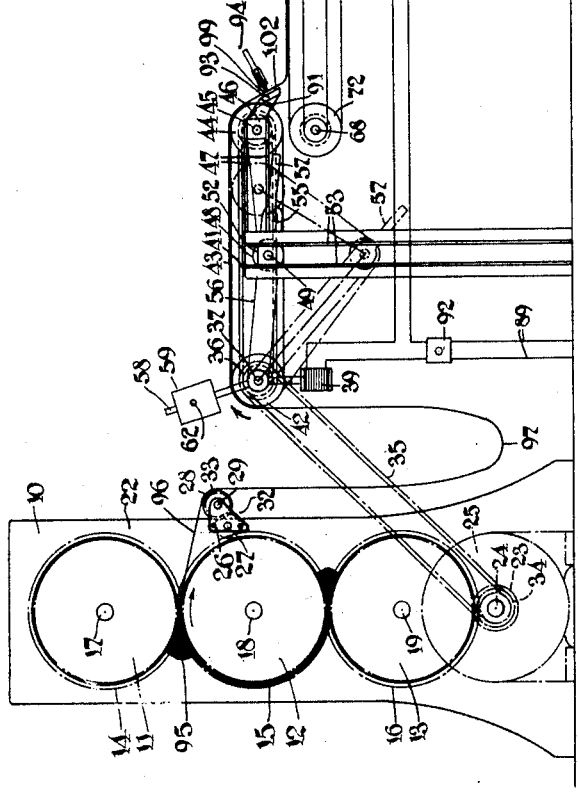
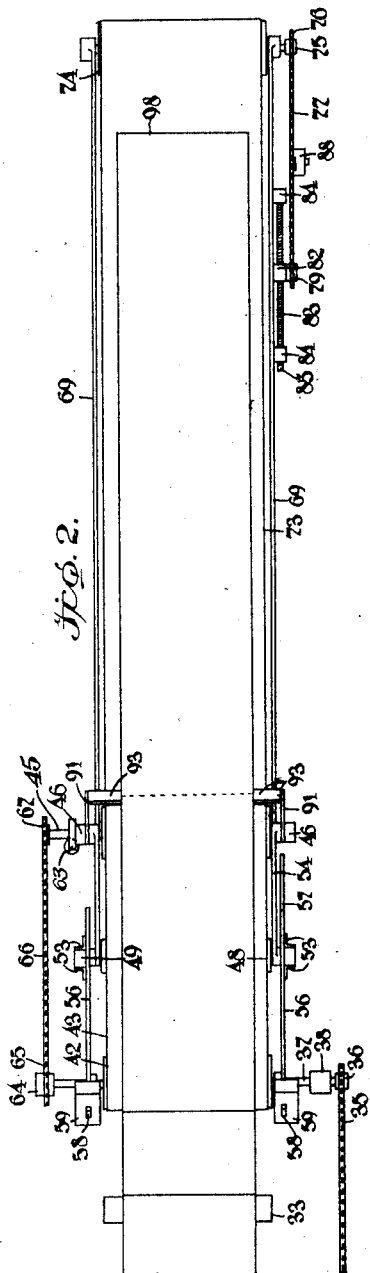

1,735,303

UNITED STATES PATENT OFFICE

JOHN B. TIFFANY, OF AKRON, OHIO, ASSIGNOR TO THE GOODYEAR TIRE & RUBBER COMPANY, OF AKRON, OHIO, A CORPORATION OF OHIO

APPARATUS FOR CONSTRUCTING TUBES

Application filed June 29, 1927. Serial No. 202,427.

My invention relates to an apparatus to be employed in manufacturing tubular articles and it has particular relation to an apparatus of the above designated character which shall be especially applicable for manufacturing inner tubes for pneumatic tire casings.

One object of my invention is to provide an apparatus suitable for manufacturing inner tubes for pneumatic tire casings at a relatively low cost per unit.

Another object of my invention is to provide an apparatus for manufacturing inner tubes that will require a reduced amount of floor space for its operation as compared with the floor space required for the operation of the apparatus now employed.

Another object of my invention is to provide an apparatus for rolling blanks of inner tube stock upon mandrels at the calender where the stock is formed.

Prior to my invention, inner tube stock has been calendered and wound between the convolutions of a roll of fabric liner in which form it was transported to a tube rolling table. The roll was mounted on a horizontal shaft supported upon one end of the table and the stock so unwound from the roll as to extend across the table. A workman formed a tube rolling blank by dividing the stock with a hand stock cutting tool along a transverse line located a predetermined distance from the end thereof. Thereafter the roll was rotated in a reverse direction in order to space the end of the stock from the blank previously severed therefrom. During these operations the liner was rewound in the form of a roll upon an adjacent shaft mounted in parallel relation to the shaft of the supply roll. The blank of stock was then rolled upon a mandrel by the workman after which the unwinding and cutting operation was repeated.

According to my invention tube stock material is received directly from the calender upon a horizontally disposed conveyor belt, a loop of the stock being permitted to extend downwardly between the calender and the conveyor belt. This conveyor belt is operated intermittently to transport a portion of the stock therebeyond, which portion is received by a second conveyor belt disposed horizontally at the end of the first and operated simultaneously therewith. The stock is then severed transversely in any suitable manner on a line intermediate the ends of a portion of the stock that extends between the two conveyors. Thereafter, the first conveyor is so manipulated as to decrease its length horizontally, the decrease in length being effective in producing a substantial spacing between the adjacent ends of the two conveyors. The first conveyor being thus removed, the blank of stock on the second conveyor is then rolled upon a mandrel to form a tube according to the usual practice. Thereafter the first conveyor is disposed in its original position and the cycle of operations repeated.

For a better understanding of the invention, reference may now be had to the accompanying drawing, forming a part of this specification, in which:

Fig. 1 illustrates diagrammatically a side elevational view of an apparatus for manufacturing inner tubes for pneumatic tire casings, according to one form which my invention may assume;

Fig. 2 is a fragmentary plan view of the apparatus illustrated by Fig. 1; and

Fig. 3 illustrates the end of a mandrel having a laminated inner tube roll thereupon.

In practicing my invention I employ a calender 10 having rolls 11, 12 and 13 provided with intermeshing gears 14, 15 and 16 respectively. The rolls 11, 12 and 13 are rotatably mounted on shafts 17, 18 and 19 respectively journaled at opposite ends in a pair of vertically disposed and spaced frame members 22. The gear 16 is adapted to mesh with a pinion 23 rigidly mounted upon the end of a shaft 24 of a motor 25, positioned adjacent one of the frame members 22. The gear 15 is adapted to mesh with a smaller gear 26 rotatably journaled on a pin 27 rigidly mounted in one of the frame members 22. This gear is adapted to mesh with a second gear 28 rigidly mounted on the end of a shaft 29 that is rotatably journaled at opposite ends in bearing blocks 32 bolted to the frame members 22. A small roll 33 is rigidly mounted on the shaft 29 intermediate the bearing blocks 32 and is adapted to rotate at a peripheral speed equal to the peripheral speed of the roll 12.

A sprocket wheel 34 is also rigidly mounted on the end of the shaft 24 adjacent the gear 23 and is adapted to drive a chain 35 operatively engaging a second sprocket wheel 36. The sprocket wheel 36 is rotatably mounted on a shaft 37 and is rigidly secured to the driving element of a clutch 38. The driven element of the clutch 38 is rigidly mounted on the shaft 37, the two elements of the clutch being operatively controlled by a solenoid 39 disposed adjacent thereto.

The shaft 37 is adapted to be journaled rotatably adjacent its ends in openings formed adjacent the ends of a pair of spaced frame members 41. A roll 42 is rigidly mounted on the shaft 37 intermediate the ends thereof and is adapted to support one end of a horizontally disposed conveyor belt 43. The opposite end of the conveyor belt 43 is similarly supported by a roll 44 rigidly mounted on a shaft 45. The ends of the shaft 45 are rotatably journaled in openings formed in rectangular blocks 46, which are slidably mounted between horizontally disposed spaced pairs of guide plates 47, that are secured to the frame members 41. A small roll 48 is disposed between the rolls 42 and 44, and is normally adapted to repose in tangential relationship to the lower reach of the belt 43. This roll is rigidly mounted on a shaft 49 journaled at its ends in rectangular blocks 52 slidably mounted between vertically disposed guides 53 secured in spaced relation at their upper ends to the frame members 41.

Bars 54 are provided with transversely formed openings at the ends thereof adapted slidably to engage the shafts 45 and 49 between the rolls 44 and 48 and the adjacent blocks 46 and 52. It is apparent that these bars maintain the rolls 44 and 48 in a uniform relative position. Between the bars 54 and the guides 53, the shaft 49 is adapted slidably to engage openings 55 formed longitudinally adjacent corresponding ends of a pair of bars 56. The opposite ends of these bars are provided with transversely disposed openings adapted slidably to engage the shaft 37 immediately adjacent opposite ends of the roll 42. One of the bars 56 at the end thereof adjacent the opening 55 is provided with a handle 57 which extends in alignment therewith beyond the end of the bar. The bars 56 are also provided with upwardly extending portions 58 adjacent the end thereof supported by the shaft 37, which are adapted to support weights 59 secured thereto by set screws 62.

When the apparatus is in its normal position, as indicated in full lines in Fig. 1, the position of the portions 58 of the rods 56 is such that the weights 59 are positioned slightly to the left hand side of the vertical plane of the center of the shaft 37. When the bars 56 are moved into the dot and dash position indicated by Fig. 1, the position of the weights 59 is substantially to the right hand side of the vertical plane of the center of the shaft 37. When the bars 56 are thus manipulated the blocks 52 and consequently the roll 48 will be moved downwardly between the guides 53. The shaft 45 of the roll 44 being mounted in the openings in the ends of bars 54, the bars 56 in which the shaft is mounted, will be moved to the right hand side of the normal position and this movement of the bars 56 will effect a corresponding movement of the roll 44. In order to prevent rotation of the roll 44, when the mechanism is operated in this manner, I provide a drag brake 63 mounted on one end of the shaft 45 and movable with the adjacent bearing block 46. The rotation of the roll 44 thus prevented, the slack in the upper reach of the conveyor belt 43 is taken up by rotation of the roll 42 in a direction indicated by the arrow.

The end of the shaft 37 opposite the clutch 38 is provided with a roller clutch mechanism 64, the driven element of which has a sprocket wheel 65 rigidly secured thereto. It is to be understood that the clutch mechanism 64 connects the sprocket wheel 65 and the shaft 37 only when the direction of rotation of the shaft is that indicated by the arrow. The sprocket wheel 65 rotatably supports a sprocket chain 66 which also operatively engages a sprocket wheel 67 mounted on one end of a shaft 68 rotatably journaled adjacent its ends in openings formed adjacent corresponding ends of horizontally disposed parallel frame members 69. A roll 72 is rigidly mounted on the shaft 68 and is adapted to support one end of a horizontally disposed conveyor belt 73. The opposite end of the conveyor belt 73 is supported in like manner by a roll 74 rigidly mounted on a shaft 75 journaled at its ends in openings in the opposite ends of the parallel frame members 69.

One end of the shaft 75 is also provided with a sprocket wheel 76 rigidly mounted thereon which is adapted to engage a sprocket chain 77 operatively associated at its opposite end with a second sprocket wheel 78. The sprocket wheel 78 is rotatably mounted on a pin 79 that is disposed within a block 82 slidably mounted on a threaded rod 83. The opposite ends of the rod 83 are rotatably journaled in blocks 84 rigidly secured to one of the parallel frame members 69. One end of the rod 83 is provided with a squared portion 85 adapted to be engaged by a wrench or other suitable mechanism for adjusting the longitudinal position of the block 82 upon the rod 83.

The chain 77 is provided with a lug 86 adapted to engage a lever 87 which controls the operation of a contact switch 88. The switch 88 is connected in a series circuit with the coil of the solenoid 39 and accordingly is adapted to control the flow of the electrical energy through the coil from a power line 89. A double pole knife switch 92 also is provided for controlling the power line 89.

The cutting mechanism of my apparatus consists of a bar 93 disposed in parallel relation to the roll 44 and rigidly secured at its opposite ends to plates 91 that are secured to one side of the blocks 46. The bar 93 is arranged immediately adjacent the roll 44 in the space intermediate the end of the belt 43 and the adjacent portion of the belt 73. Any suitable form of cutting disc of knife 94 is adapted to be drawn across the bar 93 in order to sever the material thereupon.

In the operation of my apparatus, a quantity of rubber compound material 95 which previously has been properly conditioned by an adjacent mill, not shown, is placed in operative position between the rolls of the calender 10. A continuous sheet of tube stock material 96 is thus calendered by the apparatus, which sheet of material extends over the roll 33 and depends therefrom in the form of a loop 97 between the roll and the conveyor belt 43. The lever 87 of the switch 88 is then moved in a clockwise direction thus closing a circuit through the solenoid 39 which automatically effects the operative engagement of the driving and driven elements of the clutch 38.

The conveyor belts 43 and 73 are thus driven in the direction of the arrows and the tube stock material 96 is transported across the upper reaches of both conveyor belts until such time as the lug 86 on the chain 77 makes one complete revolution and moves the lever 87 in the opposite direction thus opening the circuit previously formed which permits the disengagement of the driving and driven elements of the clutch 38. The cutting device 94 is then drawn across the bar 93 and a blank 98 of suitable length for rolling a tube is thus severed from the tube stock material 96. The attendant then grasps the handle 57 and forces the bar downwardly into the indicated dot and dash position thereof thus spacing the roll 44, and consequently the end 99 of the tube stock material 96, from the adjacent end 102 of the blank 98. A mandrel 103 is then properly positioned on one edge of the blank 98 and a tube 104 rolled thereon in the usual manner. The apparatus is then placed in normal position by raising the handle 57 and the previously described cycle of operation repeated.

In order to vary the length of the blank 98, an appropriate number of links may be added to or taken from the chain 77 and the proper corresponding position of the sprocket wheel 78 obtained by manipulation of the rod 83. It is to be understood that my apparatus is applicable for rolling the blank 98 upon mandrels positioned in either parallel or transverse relation to the vertical plane of the conveyor belt 73.

From the foregoing description it is apparent that by the employment of my invention tubular articles of any description may be manufactured at a relatively rapid rate, and that expensive apparatus for winding the stock in fabric liners and trucks for transporting the rolls of tube stock material from the calender to the rolling apparatus is dispensed with. It is also possible by employing my invention, to manufacture any given number of tubular articles with a substantial reduction in the floor space required for the apparatus, and to effect a similar reduction in the cost of labor.

Although I have illustrated but one form which my invention may assume and have described in detail but a single application thereof, it will be apparent to those skilled in the art that it is not so limited but that various minor modifications and changes may be made therein without departing from the spirit of my invention or from the scope of the appended claims.

What I claim is:

1. A tube making apparatus comprising means for forming a sheet of tube stock material, a pair of conveyor belts for receiving the sheet, means for intermittently operating the belts at equal speeds, means for severing the sheet between the belts, and a plurality of rollers for supporting one of the belts, a pair of the rollers being movable relative to each other for separating severed ends of the sheet.

2. A tube making apparatus comprising a conveyor belt for transporting a sheet of tube stock material, a second conveyor belt for transporting a sheet beyond the first belt, means for intermittently operating the belts at equal speeds, means for severing the sheet between the two belts, and a movable roller for supporting the delivering end of the first belt, the roller being movable away from the second belt for separating the severed ends of the sheet.

3. A tube making apparatus comprising delivering and receiving conveyor belts for supporting a sheet of tube stock material, means for severing the material between the belts, and means for moving the supporting roller at the delivering end of the first belt away from the receiving end of the second belt.

In witness whereof, I have hereunto signed my name.

Signed at Akron, in the county of Summit and State of Ohio, this 27 day of June, 1927.

JOHN B. TIFFANY.